United States Patent
Buchenkov et al.

(10) Patent No.: US 12,393,168 B1
(45) Date of Patent: Aug. 19, 2025

(54) ADAPTIVE MANUFACTURING METHOD FOR BUILDING COMPONENTS

(71) Applicant: ADDRESS ROBOTICS LIMITED, UK, London (GB)

(72) Inventors: Stanislav Buchenkov, Belgrade (RS); Semen Nagornyi, Belgrade (RS); Kirill Kuznetcov, Belgrade (RS); Rodion Shishkov, London (GB); Viktor Rukavishnikov, Belgrade (RS)

(73) Assignee: ADDRESS ROBOTICS LIMITED, UK, London (GB)

( * ) Notice: Subject to any disclaimer, the term of this patent is extended or adjusted under 35 U.S.C. 154(b) by 0 days.

(21) Appl. No.: 19/049,915

(22) Filed: Feb. 10, 2025

(51) Int. Cl.
*G05B 13/04* (2006.01)

(52) U.S. Cl.
CPC .................... *G05B 13/042* (2013.01)

(58) Field of Classification Search
CPC .................................... G05B 13/042
See application file for complete search history.

(56) References Cited

U.S. PATENT DOCUMENTS

| | | | |
|---|---|---|---|
| 2003/0033041 A1* | 2/2003 | Richey | G05B 19/4097 |
| | | | 700/98 |
| 2006/0075718 A1* | 4/2006 | Borne | G06F 30/13 |
| | | | 52/745.02 |

(Continued)

OTHER PUBLICATIONS

Riggio, Mariapaola, Jakub Sandak, and Steffen Franke. "Application of imaging techniques for detection of defects, damage and decay in timber structures on-site." Construction and Building Materials 101 (2015): 1241-1252 (Year: 2015).*

(Continued)

*Primary Examiner* — Christopher E. Everett
(74) *Attorney, Agent, or Firm* — ASLAN LAW, P.C.

(57) ABSTRACT

The present invention relates to an adaptive manufacturing method for building components, particularly in prefabrication, modular construction, and panelized construction. The invention minimizes cumulative errors in building component production, enhances precision, and facilitates automated assembly using real-time digital updates. The method includes creating a digital information model of a building, containing data on the dimensions and positions of building components; manufacturing at least one building component based on initial model parameters; scanning the manufactured component using laser scanning, structured light scanning, or ultrasound-based scanning, selected based on the material properties, to generate a digital representation of its actual dimensions and shape; updating the digital model with the scanned data to dynamically adjust parameters for subsequent components; recalculating and adjusting the parameters of unmanufactured components based on detected deviations; transmitting adjusted parameters to an automated manufacturing system for real-time modifications in production. The system comprises a processor executing adaptive manufacturing instructions, a scanning module, a processing unit, and a recalculation module that updates component dimensions based on deviations, ensuring seamless integration of prefabricated elements.

13 Claims, 2 Drawing Sheets

(56) References Cited

U.S. PATENT DOCUMENTS

| | | | | |
|---|---|---|---|---|
| 2016/0202691 | A1* | 7/2016 | Pettersson | G05B 19/41865 700/98 |
| 2017/0256100 | A1* | 9/2017 | Lee | G06F 30/13 |
| 2017/0337299 | A1* | 11/2017 | Tang | G06Q 50/08 |
| 2018/0173209 | A1* | 6/2018 | Iseli | G01B 21/04 |
| 2021/0043003 | A1* | 2/2021 | Ruan | G01C 21/206 |
| 2021/0356950 | A1* | 11/2021 | Garvey | G05B 19/401 |
| 2022/0347804 | A1* | 11/2022 | Baaj | E04H 5/02 |

OTHER PUBLICATIONS

Sood, Anoop Kumar, R. K. Ohdar, and Siba Sankar Mahapatra. "Improving dimensional accuracy of fused deposition modelling processed part using grey Taguchi method." Materials & design 30.10 (2009): 4243-4252 (Year: 2009).*

Lu, Xufei, et al. "Substrate design to minimize residual stresses in Directed Energy Deposition AM processes." Materials & Design 202 (2021): 109525 (Year: 2021).*

Tan, Yi, et al. "Automated geometric quality inspection for modular boxes using BIM and LiDAR." Automation in Construction 164 (2024): 105474. (Year: 2024).*

Noghabaei, Mojtaba, Yajie Liu, and Kevin Han. "Automated compatibility checking of prefabricated components using 3D as-built models and BIM." Automation in Construction 143 (2022): 104566. (Year: 2022).*

Braun, Alexander, et al. "A concept for automated construction progress monitoring using bim-based geometric constraints and photogrammetric point clouds." J. Inf. Technol. Constr. 20.5 (2015): 68-79. (Year: 2015).*

Son, Rachel Hyo, and Kevin Han. "Automated model-based 3D scan planning for prefabricated building components." Journal of Computing in Civil Engineering 37.2 (2023): 04022058. (Year: 2023).*

Pahnabi, Narges, Thomas Schumacher, and Arijit Sinha. "Imaging of structural timber based on in situ Radar and ultrasonic wave measurements: A review of the state-of-the-art." Sensors 24.9 (2024): 2901. (Year: 2024).*

Racine, Josephine; Lumpkin, Bryce; Mclain, Richard. "Differential Material Movement in Tall Mass Timber Structures: An Overview of Column Movement Types and How to Address Them." WoodWorks Solution Paper WW-WSP-26, 2022, 20 pp. WoodWorks—Wood Products Council, USA.

Author Unknown. "Design and Construction of Taller Wood Buildings." Think Wood Continuing-Education White Paper (AIA Course AR092019-2), 2019, 14 pp. Think Wood, USA.

Kinder, Erin; Kingsley, Greg. "Mass Timber Connections Index: Optimal Connection Considerations." WoodWorks Solution Paper WW-WSP-21, updated Sep. 1, 2021, 8 pp. WoodWorks—Wood Products Council, USA.

Brennan, Jennifer; Vokes, Clare; Massey, Terry; Duncheva, Mila; Plowas, Wojciech; Livingstone, Andrew; Reid, Alasdair; Williamson, Julio Bros; Hairstans, Robert."Volumetric Modular Construction Research." Research and Analysis Report, Nov. 26, 2024, online publication (pagination not specified). Ministry of Housing, Communities & Local Government, United Kingdom.

* cited by examiner

101 — Creating a digital information model of a building containing at least building components' dimensions and positions 102 — Scanning at least one manufactured building component using at least one of laser scanning, or structured light scanning, or ultrasound-based scanning, selected based on the material properties of the component to generate a digital representation of its actual dimensions and shape 103 — Updating the digital information model based on at least the scanned component's actual dimensions and shape to dynamically adjust manufacturing parameters for subsequent components 104 — Recalculating and adjusting the parameters of unmanufactured building components based on deviations detected in the scanned building component 105 — Transmitting the adjustments to an automated manufacturing system for real-time modifications to production equipment. During the production of each subsequent building component, the parameters obtained from the latest model update are used

Fig. 1

ADAPTIVE MANUFACTURING METHOD FOR BUILDING COMPONENTS

FIELD OF APPLICATION

The invention is applicable for the manufacturing of building components for any construction methods involving the assembly of objects from pre-manufactured elements, such as prefabrication, modular construction, panelized construction, and other similar techniques.

Such pre-manufactured elements may include structural components (e.g., walls, columns, slabs) as well as large modules (e.g., entire rooms, sections of floors). Throughout this description, these pre-manufactured elements are collectively referred to as building components or just components.

The method is applicable to the creation of any construction objects—buildings, structures, or others, primarily those featuring internal volumes enclosed by walls, floors, and ceilings. Throughout this description, all construction objects to which this method applies will be referred to as buildings.

PRIOR ART

Currently, construction methods utilizing pre-manufactured building elements, such as prefabrication, modular construction, panelized construction, and other similar techniques, are widely used. Pre-manufactured elements (referred to as building components) include walls, columns, slabs, as well as larger modules such as rooms or sections of floors. These methods are popular due to their speed, cost-efficiency, and potential for construction automation. However, existing approaches have several limitations.

The assembly of construction objects requires high manufacturing precision for building components, as deviations from design parameters can result in cumulative errors during assembly, thereby reducing the quality of the final building. In practice, such deviations often occur due to imperfections in manufacturing and quality control technologies at production facilities.

To eliminate these discrepancies in the parameters of building components, additional adjustments are often required during the assembly stage. These adjustments include manual fitting, grinding, trimming, or the use of additional materials. Such processes increase both time and financial costs, make the automation of assembly virtually impossible, and limit the use of robotic systems, thereby reducing productivity and restricting the adoption of these technologies in large-scale construction projects.

Existing digital building modeling systems (BIM—Building Information Modeling) enable the design of construction objects and the planning of their assembly but do not account for actual deviations in the parameters of building components that occur during manufacturing. This leads to inconsistencies between the design data and the real assembly process, exacerbating the problem of errors.

SUMMARY OF THE INVENTION

A method for adaptive manufacturing of building components (FIG. 1) performed by a processor comprising the following steps: creating a digital information model of a building containing at least building components' dimensions and positions; manufacturing at least one building component; scanning at least one manufactured building component using at least one of laser scanning, or structured light scanning, or ultrasound-based scanning, selected based on the material properties of the component to generate a digital representation of its actual dimensions and shape; updating the digital information model based on at least the scanned component's actual dimensions and shape to dynamically adjust manufacturing parameters for subsequent components; recalculating and adjusting the parameters of unmanufactured building components based on deviations detected in the scanned building component, wherein the adjustments are transmitted to an automated manufacturing system for real-time modifications to production equipment, wherein during the production of each subsequent building component, the parameters obtained from the latest model update are used.

A system for adaptive manufacturing of building components (FIG. 2), comprising: at least one processor configured to execute adaptive manufacturing instructions and control at least one automated manufacturing device; a scanning module configured to capture actual dimensions of manufactured components using structured light, or laser scanning, or ultrasound-based metrology techniques; a processing unit, executed by at least one processor, configured to compare scanned data with the digital information model and detect deviations; a recalculation module that adjusts parameters of remaining components based on detected deviations, wherein the adjusted parameters, obtained from the updated digital information model, are transmitted to at least one manufacturing device.

The use of the invention minimizes cumulative errors, which improves the quality of the finished buildings; reduces the precision requirements for manufacturing building components, thereby enabling faster production and lowering associated costs; and eliminates the need for adjustments to building components during the assembly of buildings, which facilitates the automation of the assembly process, including the use of robotic systems.

In some embodiments, a digital information model of the building contains, at a minimum, data on the dimensions and shape of each building component and its location within the model, as well as the ability to modify this data for each building component. The dimensions and shape of the manufactured building component are updated in the digital information model of the building to match the parameters obtained through scanning. The parameters of the remaining building components that have not yet been manufactured are checked within the digital information model to determine whether adjustments are required based on the updated parameters of the scanned building component. If necessary, the parameters (dimensions and/or shape) of the remaining building components are adjusted to compensate for discrepancies between the manufactured building component and the parameters initially specified in the digital information model. During the assembly of the building, each building component is installed at its designated position as specified in the digital information model.

As a result, the manufacturing of each subsequent building component accounts for discrepancies between all previously manufactured building components and the digital information model of the building. These discrepancies are compensated for by adjusting the parameters of the subsequently manufactured building components.

BRIEF DESCRIPTION OF THE DRAWINGS

FIG. 1—block diagram illustrating one of possible embodiments

DETAILED DESCRIPTION OF THE INVENTION

Figure 2:
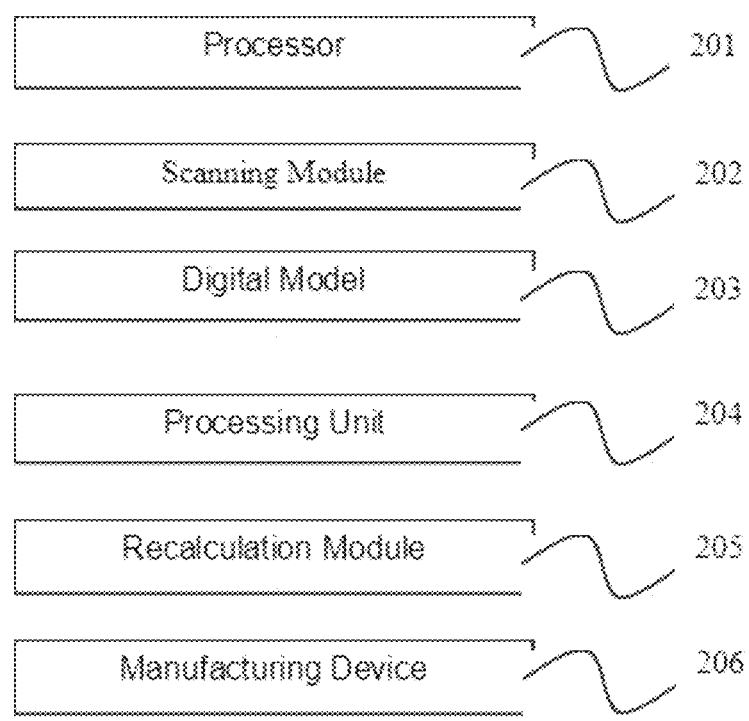
FIG. 2—block diagram illustrating one of possible embodiments

The invention relates to a method for manufacturing building components suitable for various construction methods, such as prefabrication, modular construction, panelized construction, and other similar techniques. These building components include, but are not limited to, structural elements (e.g., walls, columns, slabs) and large modules (e.g., entire rooms or floor sections).

The use of feedback with the digital information model of the building, which is updated after each step of scanning the manufactured building component, eliminates the accumulation of errors and ensures accurate assembly. Through the proposed invention, the digital information model of the building becomes dynamic, allowing it to account for the actual dimensions of each element and ensuring their precise connection.

The parameters of each building component are adjusted based on the actual dimensions of previously manufactured components, enabling the use of less precise and more cost-effective equipment.

The automatic compensation of deviations during the design and manufacturing stages of building components eliminates the need for manual adjustments.

The precision of the aligned parameters of building components makes it possible to utilize robotic systems for their installation.

The steps described in Step 1: Creating a Digital Information Model of the Building, Step 2: Scanning the Manufactured Building Component, Step 3: Updating the Digital Model with Scanned Data, and Step 4: Recalculating and Adjusting Parameters for Remaining Components are implemented using software tools executed by a processor or multiple processors. These steps can be carried out by a single software program or distributed across multiple software programs that operate independently or in coordination.

In some embodiments, the software tools are executed on local computing devices, such as workstations, servers, or embedded computing platforms integrated into manufacturing equipment. In alternative embodiments, the software tools operate on cloud-based platforms, enabling real-time data processing, collaboration, and synchronization across multiple stakeholders.

The execution of these steps may involve automated data processing algorithms, machine learning models, or rule-based logic to dynamically adjust parameters, optimize manufacturing sequences, and minimize cumulative errors. The digital information model and scanned data may be stored in relational databases, non-relational databases, or distributed data storage systems, ensuring seamless updates and retrieval of component parameters throughout the manufacturing process.

In some embodiments, Application Programming Interfaces (APIs) or communication protocols are utilized to enable interoperability between different software tools, ensuring efficient data exchange between the digital information model, scanning equipment, and manufacturing control systems.

The described software-based implementation enhances precision, automation, and adaptability, allowing for efficient real-time updates to the digital information model while reducing reliance on manual intervention.

The method consists of several sequential steps, each described below, along with examples of possible embodiments for implementing the invention.

The steps described in Step 1: Creating a Digital Information Model of the Building, Step 2: Scanning the Manufactured Building Component, Step 3: Updating the Digital Model with Scanned Data, and Step 4: Recalculating and Adjusting Parameters for Remaining Components are implemented using software tools executed by a processor or multiple processors. These steps can be carried out by a single software program or distributed across multiple software programs that operate independently or in coordination.

In some embodiments, the software tools are executed on local computing devices, such as workstations, servers, or embedded computing platforms integrated into manufacturing equipment. In alternative embodiments, the software tools operate on cloud-based platforms, enabling real-time data processing, collaboration, and synchronization across multiple stakeholders.

In some embodiments, the execution of these steps may involve automated data processing algorithms, machine learning models, or rule-based logic to dynamically adjust parameters, optimize manufacturing sequences, and minimize cumulative errors. The digital information model and scanned data may be stored in relational databases, non-relational databases, or distributed data storage systems, ensuring seamless updates and retrieval of component parameters throughout the manufacturing process.

In some embodiments, Application Programming Interfaces (APIs) or communication protocols are utilized to enable interoperability between different software tools, ensuring efficient data exchange between the digital information model, scanning equipment, and manufacturing control systems.

Step 1: Creating a Digital Information Model of the Building

The first step involves creating a digital information model of the building. This model includes data about the dimensions, shapes, and positions of all building components and allows for dynamic updates to the parameters of individual components as they are manufactured.

The method described herein utilizes a digital information model of a building, which serves as a computational representation of the building's structure and its components. This model enables precise control over the manufacturing process by dynamically updating the parameters of building components as they are produced.

In some embodiments, the digital information model consists of individual elements, each corresponding to a specific building component. These elements are associated with parametric data, which may include, but is not limited to: geometric dimensions (length, width, height, thickness); material properties (density, elasticity, thermal conductivity); structural characteristics (load-bearing capacity, connection points, reinforcement details); manufacturing tolerances (acceptable dimensional deviations); assembly data (alignment features, joint configurations, fastener positions).

In this embodiment, each element within the model exists as an independent entity, allowing for targeted modifications and adjustments to specific components without affecting unrelated parts of the building. This modular structure ensures flexibility in updating and optimizing individual building components based on real-time manufacturing data.

In alternative embodiments, the digital information model is implemented as a unified model, in which the parameters of each building component are embedded within a single integrated dataset. In this case, updates to any individual component trigger an automated recalibration of the entire model, ensuring that all elements remain consistent with one another and with the overall design specifications.

In some embodiments, the digital information model may be stored, processed, and updated using specialized software tools, such as Building Information Modeling (BIM) software, computational design frameworks, or custom parametric modeling solutions. These tools may operate on local computing systems, cloud-based platforms, or distributed computing environments, allowing real-time collaboration among engineers, architects, and manufacturing specialists.

In some embodiments, the software utilized in the present invention stores scanned data of manufactured building components in the form of a point cloud. A point cloud is a three-dimensional (3D) representation of a physical object, consisting of a large set of discrete data points defined in a common coordinate system. These points collectively represent the shape, dimensions, and surface characteristics of the scanned object.

In some embodiments, the point cloud is stored in industry-standard file formats, including but not limited to:
- PLY (Polygon File Format)—A widely used format that supports additional metadata such as color and surface normals, making it useful for architectural and engineering applications.
- LAS (Lidar Data Exchange Format)—A format optimized for high-precision LiDAR scanning, frequently used in construction and geospatial modeling.
- E57 (ASTM E2807 Standard Format)—A structured format designed for storing point clouds, metadata, and associated images, ensuring interoperability between different scanning and modeling tools.
- XYZ (ASCII Point Cloud Format)—A simple, text-based format containing x, y, and z coordinates, often used for raw data storage and manual processing.
- PCD (Point Cloud Data Format)—A format specifically designed for fast processing and real-time applications, commonly used in robotic automation and manufacturing quality control.

In some embodiments, the software converts raw point cloud data into a structured model by applying data compression, filtering, and noise reduction algorithms. The processed point cloud may then be stored in binary or compressed formats to reduce storage space while preserving geometric accuracy.

In some embodiments, to facilitate seamless integration with the digital information model of the building, the point cloud data may be stored in relational databases, non-relational databases, or distributed cloud storage platforms. This enables real-time access, modification, and synchronization of data across multiple computing systems involved in the manufacturing and assembly process.

In some embodiments, the digital model is created using Building Information Modeling (BIM) software such as Autodesk Revit, Tekla Structures, or similar tools. The model contains data about the geometry and positioning of all components. For example, a digital model of a modular residential building may include room modules with pre-defined dimensions and positions for doors, windows, and utility connections.

In some embodiments, the digital model is integrated with structural analysis tools to simulate load distribution and thermal properties, ensuring that updated dimensions remain compliant with building standards. For instance, the digital model of a high-rise building may incorporate wind load calculations to dynamically adjust the shape and size of outer panels.

In some embodiments, the digital model is hosted on a cloud-based platform to enable real-time collaboration among architects, engineers, and manufacturers. Updates to the parameters of one component are automatically synchronized across all stakeholders. For example, a commercial office building's model could be shared among manufacturing teams to accommodate site-specific constraints efficiently.

Step 1.1: Selecting One or More Building Components for Manufacturing

In some embodiments, at least one building component is manufactured. In alternative embodiments, multiple building components may be manufactured at this step, provided that all manufacturing building components are not interconnected elements, meaning they are not mating elements or adjacent elements. Manufacturing can be carried out at the same location and by the same entity that performs other steps of this method or by different entities at other locations.

This step involves selecting at least one building component for manufacturing. The selected component, or group of components, is chosen such that it is not an interconnected element, meaning it does not directly connect to another component during the assembly process.

In some embodiments, building component are selected sequentially based on their hierarchy within the building structure. For example, outer walls of a modular house may be selected first, while slabs and inner partitions are selected later to avoid interference during assembly.

In some embodiments, non-interconnected building component are grouped into clusters for simultaneous production. For instance, isolated columns and distant beams in a multi-story parking structure may be selected for manufacturing in parallel.

In some embodiments, the selection process is optimized to prioritize geometrically independent building component, reducing the risk of assembly conflicts. For example, non-adjacent facade panels in a prefabricated school building may be selected first to simplify production logistics.

In some embodiments, automated and semi-automated manufacturing processes may be used for producing building components with high precision. The selection of machines and methods depends on the type of building component being manufactured, its material composition, and the required dimensional accuracy. The manufacturing process generally involves material preparation, assembly and bonding, pressing and curing, CNC machining and finishing, and quality control before transportation to the construction site.

In some embodiments, to produce cross-laminated timber (CLT) panels, a high-strength engineered wood panel composed of multiple layers of solid-sawn lumber boards arranged perpendicularly and bonded with structural adhesives, specialized woodworking and industrial automation equipment are employed. The process begins with wood processing and board preparation, where planers and thicknessers ensure uniform board thickness and smooth surfaces, while moisture meters and drying kilns regulate moisture content to prevent warping. The prepared wood layers are then assembled and bonded using glue applicators and spreaders, which distribute adhesive evenly, followed by automatic lay-up systems that align each layer precisely to form CLT panels. Once the layers are arranged, hydraulic or vacuum presses apply controlled pressure to bond the layers, while curing methods, either heat-assisted or natural, ensure the adhesive sets correctly.

In some embodiments, following the bonding process, CNC routers and robotic cutting systems are used to achieve precise machining of the panels, including openings for doors, windows, and joints. Edge finishing and protective coating applications are then carried out to enhance durability and compliance with fire safety standards. Throughout manufacturing, quality control may be maintained through 3D scanning and laser measurement systems that verify dimensions by comparing the manufactured CLT panel with the digital information model, while automated defect detection systems analyze the panels for structural integrity, identifying defects such as cracks, knots, or inconsistencies in adhesive application.

For other prefabricated building components, such as concrete panels, steel structures, and composite materials, specialized manufacturing techniques may be utilized. Precast concrete panels may be produced using automated concrete casting lines with vibration tables and robotic trowels to achieve precise formwork and surface finishing. Steel frame modules may be fabricated with CNC-controlled laser cutting systems and robotic welding stations, ensuring structural accuracy and efficiency in assembly. Composite panels may be manufactured using vacuum-assisted resin transfer molding or pultrusion processes, which allow for the production of high-strength fiber-reinforced components with optimized material distribution.

Step 2: Scanning the Manufactured Building Component

A manufactured building component is scanned to obtain a digital representation of its actual dimensions and shape. This step ensures that deviations from the original design are identified and recorded and all subsequent manufacturing and assembly processes account for real-world variations in component dimensions, thereby minimizing cumulative errors.

In some embodiments, the scanning of the manufactured building component is performed to capture its actual geometry and compare it with the design model to identify deviations.

In some embodiments, the scanning process is conducted using robotic laser scanning technology. A metrology-grade laser scanner is mounted on a robotic arm equipped with an interchangeable metrological gripper, allowing precise positioning of the scanner relative to the component being inspected. The system generates a high-resolution point cloud that represents the three-dimensional (3D) surface of the scanned component in a unified coordinate system.

In some embodiments, before scanning, the manufactured component is positioned in a controlled environment to prevent external factors such as vibrations, lighting variations, or misalignment from affecting the accuracy of the scanned data. The component may be placed on a stationary inspection platform, a conveyor system, or a robotic fixture that aligns it for scanning.

In some embodiments, to ensure the accuracy of the captured data, reference markers or fiducial points may be placed on the component. These markers serve as alignment references, allowing the scanning system to accurately map the component within the global coordinate system of the digital building model.

In some embodiments, the scanning operation begins when the robotic arm moves the laser scanner along a predefined scanning path, ensuring full coverage of the component's surface. The laser scanner emits a structured light pattern or laser beam across the surface of the component, and the reflected light is captured by a high-precision optical sensor. The scanner records thousands to millions of data points per second, creating a dense point cloud that defines the exact geometry of the scanned component.

In some embodiments, as the scanner moves, real-time position tracking of the robotic arm is performed, synchronizing the scanner's movement with the coordinate system of the building model. This ensures that each scanned point is assigned a precise location in the digital reference space, allowing for direct comparison with the original design specifications.

In some embodiments, the scanning process may use multiple scanning passes depending on the complexity and size of the component. Overlapping scans are automatically aligned using point cloud registration algorithms, ensuring continuity and eliminating gaps in the captured data.

In some embodiments, to ensure scanning accuracy across a variety of materials, the system utilizes multiple scanning technologies, including laser-based scanning, structured light scanning for reflective and transparent surfaces, and ultrasound-based scanning for dense or layered materials. Real-time validation mechanisms assess scan completeness, identify noise, and determine whether additional scanning passes are required. The system can autonomously repeat scans or alert an operator if manual intervention is necessary.

Laser Scanning is preferred for wood, concrete, and metal due to high accuracy and suitability for rough surfaces. Structured Light Scanning is preferred for reflective or transparent materials like glass, polished metals, and polymer composites, minimizing laser reflection errors. Ultrasound-Based Scanning may be used for dense materials like thick concrete and reinforced slabs, detecting internal voids and reinforcement positioning.

In some embodiments, 3D laser scanning is used to create a high-resolution model of the manufactured component, capturing all details. For example, a concrete wall panel with embedded fixtures may be scanned to ensure precise alignment with electrical conduits.

In some embodiments, structured light scanning is applied for non-metallic components, such as wood or polymer panels, to achieve accurate measurements with minimal surface impact. For instance, wooden walls for a modular home may be scanned to verify joint dimensions.

In some embodiments, ultrasound-based measurement is used for dense or thick components to verify both internal and external dimensions. For example, precast concrete beams may be scanned to confirm the position of internal reinforcement.

In some embodiments, once the point cloud data is generated, it is processed using automated computational tools to remove noise, filter out irrelevant data, and refine the 3D model.

In some embodiments, the processed point cloud is then converted into a computer-aided design (CAD) model, representing the actual manufactured component.

In some embodiments, the CAD model of the scanned component is compared to the design model stored in the digital information system. A deviation report is generated, highlighting any discrepancies between the actual and intended geometry of the component. The deviations are analyzed based on pre-defined tolerance levels, which may vary depending on structural, regulatory, and functional requirements.

In some embodiments, the system dynamically determines acceptable tolerance limits for different building components based on regulatory standards, material properties, and functional requirements. These thresholds are set through a combination of pre-defined industry tolerances (e.g., DIN 18203-3 for CLT components), machine learning models that analyze historical deviation patterns, and real-time adjustments based on actual scanned data. If a deviation exceeds the maximum acceptable limit, the system evaluates whether an alternative corrective strategy (e.g., adjusting adjacent components) is feasible or whether the component must be rejected and re-manufactured.

In some embodiments, the scanned point cloud data is aligned with the original model using point cloud registration algorithms, such as Iterative Closest Point (ICP) or Singular Value Decomposition (SVD), to determine deviations.

In some embodiments, if the detected deviations fall within the acceptable tolerance range, no modifications are required. However, if deviations exceed allowable limits, corrective measures are initiated. These measures may include: adjusting the parameters of unproduced components to compensate for deviations; modifying the assembly process by recommending alternative connector types or installation techniques; reprocessing the scanned component if deviations exceed a critical threshold.

Step 3: Updating the Digital Model with Scanned Data

The dimensions and shape of the manufactured building component, obtained from scanning, are used to update the digital information model of the building. This ensures that subsequent manufacturing and assembly processes account for real-world deviations. This step enables dynamic adaptation of the building model to reflect the actual dimensions and shape of the produced components, thereby minimizing errors and ensuring structural integrity.

In some embodiments, updating the digital building model can be performed using one of the described approaches, depending on the level of precision required and the computational resources available.

In some embodiments, the original model of the manufactured building component within the 3D building model is completely replaced by the scanned model. This ensures that all subsequent calculations, simulations, and adjustments are based on the actual geometry rather than the originally planned dimensions. The process begins with the conversion of the scanned point cloud data into a computer-aided design (CAD) model that accurately represents the manufactured component. The newly created CAD model is then aligned with the global coordinate system of the digital building model to maintain consistency in spatial positioning. Once alignment is completed, the digital building model is updated by replacing the previously stored component model with the newly generated scanned model. Any dependent components within the building model that interface with the scanned component are automatically reanalyzed to ensure compatibility. This approach is particularly beneficial for components with complex geometric features, such as custom-fitted panels, structural elements with intricate recesses, or modules requiring precise interconnections.

As an alternative to full model replacement, the digital building model can be updated by modifying only the parameters of the manufactured component while keeping its original geometric representation. This method reduces computational load and allows for incremental adjustments without altering the overall model structure. Specific geometric attributes of the component, such as length, width, height, thickness, or shape, are extracted from the scanned data and used to modify the corresponding parameters in the digital model. The update process involves the following steps:

Extracting key dimensional data from the scanned model.
Comparing the extracted values with the original design parameters to detect deviations.
Updating only the affected parameters in the digital building model while preserving the original structure.

In such approach, when only parameters (rather than full model replacements) are updated in the 3D model, the system integrates geometric consistency checks. These include recalculating load-bearing distributions, validating joint compatibility, and running stress simulations to prevent misalignment. Automated conflict detection ensures that modifications such as wall thickness adjustments do not interfere with pre-planned installations or mechanical systems.

This method is particularly useful for standardized building components that do not require full geometric reconstruction but still benefit from dimensional corrections. It may be applied when minor deviations do not affect the component's functional fit or when regulatory tolerances allow for small dimensional variations without compromising the structural integrity of the assembly.

Regardless of the selected approach, the updated data is stored in the digital building model, which is used for:
Recalculating the parameters of unproduced components to compensate for dimensional discrepancies.
Optimizing the assembly process by adjusting connector positions, fastening methods, or on-site installation techniques.
Generating an updated deviation report, which provides insights into whether further adjustments are necessary for regulatory, functional, or economic reasons.

In some embodiments, the scanned data is directly integrated into the digital model, overriding the original parameters. For example, the length of a prefabricated slab may be updated in the model to reflect a 5 mm deviation from the planned design.

In some embodiments, deviations between the scanned component and the original model are visualized as an error map to aid further analysis. For instance, a heatmap may highlight areas where a manufactured wall panel deviates most from the design.

In some embodiments, the digital model automatically adjusts parameters within predefined tolerances to ensure compliance with structural requirements. For example, the thickness of a precast floor panel may be recalculated to accommodate minor deviations in adjacent walls.

Step 4: Recalculating and Adjusting Parameters for Remaining Components

After updating the digital information model with the actual parameters of the scanned building component, the system performs automated recalculations to adjust the parameters of other components that are directly affected by the detected deviations. These recalculations ensure that subsequent manufacturing and assembly steps compensate for dimensional or geometric variations, thereby preserving the structural integrity and functional alignment of the building.

During the production of each subsequent building component, the parameters obtained from the latest model update are used.

In some embodiments, recalculations are performed exclusively for building components that have at least one surface adjacent to at least one surface of the scanned component, provided that the scanned component exhibits deviations from its original 3D model. This localized recalibration prevents unnecessary modifications to unaffected components while maintaining the accuracy of the overall construction process.

The adjustments are carried out so that, once the modified components are manufactured and assembled, they compensate for the deviations of the adjacent scanned component, ensuring that all surfaces align correctly. The recalculations may involve dimensional modifications (e.g., length, width, height) or geometric alterations (e.g., tilt angles, recesses, joint modifications).

The following examples illustrate the implementation of the adaptive manufacturing method for building components, ensuring precise assembly by compensating for deviations detected during manufacturing. The described building consists of multiple prefabricated elements, including load-bearing walls and floor and ceiling slabs, which are subject to scanning and real-time adjustments within the digital information model.

By dynamically recalculating dimensions and adjusting manufacturing parameters, the invention eliminates cumulative errors, reduces the need for manual modifications, and enhances automation in modular construction. Each example below demonstrates how specific deviations in manufactured components are identified and compensated for in subsequent production stages, ensuring structural integrity and assembly accuracy.

Example 1: During the construction of a modular building, a floor slab is manufactured and subsequently scanned to determine its actual dimensions. If the scanned data reveals that the floor slab is 3 mm narrower than the dimensions specified in the digital information model, the system initiates a recalculation of the adjacent floor slabs to compensate for the dimensional discrepancy. Specifically, each adjacent floor slab is modified to be 1.5 mm wider, ensuring that the total coverage area remains as per the original design specifications. Conversely, if the scanned floor slab is detected to be 3 mm wider than specified, the adjacent floor slabs are each manufactured 1.5 mm narrower, maintaining the planned fit and structural integrity of the assembly. The recalculations are performed automatically within the digital information model, updating the parameters for subsequent manufacturing processes to avoid cumulative errors. The implementation of this adaptive adjustment method eliminates the need for on-site modifications and ensures precise alignment of prefabricated components.

Example 2: During the assembly of a modular unit, a wall panel is scanned post-manufacturing to verify its actual dimensions against the digital information model. The scan detects that the wall panel is 2 mm taller than specified in the design. To ensure proper assembly without altering the wall panel itself, the ceiling slab is adjusted to accommodate this deviation. In particular, a recess is created in the ceiling slab at the point where the wall panel connects. This recess is precisely 2 mm deep, compensating for the height difference and allowing the ceiling slab to fit seamlessly over the wall panel without introducing additional stress or misalignment in the structure. This real-time adaptive modification prevents the need for manual trimming or structural compromises, reducing assembly time and improving overall construction precision.

Example 3: In a scenario where two wall panels are aligned in the same plane, a deviation in the tilt angle of one wall panel's end section is detected during post-manufacturing scanning. The scanned data shows that the end section of the wall has an angular deviation that would otherwise create an improper joint when assembled with the adjacent wall panel. To correct this deviation, the end section of the adjacent wall panel is manufactured with an additional angular compensation, ensuring that when the two wall panels are joined, they form a continuous, properly aligned surface. The compensation angle is calculated automatically based on the measured deviation and applied during the manufacturing of the adjacent wall panel. This approach ensures that wall joints remain structurally sound, maintaining the intended aesthetic and functional characteristics of the building while eliminating the need for on-site adjustments.

The updated digital model accounts for these geometric compensations, and once the modified wall is manufactured and scanned, the next set of recalculations is performed to maintain continuity across the structure.

In some embodiments, the recalculations are performed using computational algorithms that analyze the degree and direction of deviation in the scanned component. The system determines:

Which adjacent components are affected by the deviation.
What parameter modifications (dimensional or geometric) are required to compensate.
Whether further recalculations will be necessary for subsequent components.

In some embodiments, the recalculated parameters are then stored in the digital building model, ensuring that all future manufacturing steps align with the actual conditions observed in the scanned components.

In some embodiments, the parameters of each remaining component are adjusted iteratively based on deviations from previously manufactured components. For example, the width of a floor slab may be reduced by 3 mm to align with a slightly oversized wall panel.

In some embodiments, the recalculations are performed in batches for groups of interconnected components. For instance, multiple roof panels may be resized simultaneously to align with corrected truss dimensions.

In some embodiments, the updated parameters are validated using structural analysis software to ensure compliance with building codes. For example, recalculated dimensions for a bridge deck may be checked to verify that its load-bearing capacity remains within acceptable limits.

In some embodiments, an AI-powered system can automate the analysis, recalculations, and optimization of component adjustments. The AI model operates in the following manner. A deep learning model is trained on historical deviations detected in scanned building components. The model predicts which adjacent components will likely require recalculations and by how much. A reinforcement learning (RL) agent is used to determine the optimal adjustment strategy. The reward function is designed to minimize cumulative errors while keeping modifications within practical manufacturing constraints. The RL agent tests different adjustment strategies (e.g., reducing wall length, modifying joint positions) and selects the one that requires the least material adjustment while preserving stability. A generative AI model evaluates multiple variations of component adjustments to find the most efficient geometric modification. The AI suggests alternative manufacturing strategies, such as changing joint configurations instead of modifying component dimensions. The AI system continuously improves based on new scanned components. As more deviations are detected, the AI updates its predictive recalibration models, refining how future deviations are managed.

In some embodiments, difference-based environmental modeling approach can be applied. In this approach, the comparison process is treated as the difference between two environments, where the scanned component represents a rigid environment and the remaining model is a soft, variable environment that must adapt to the rigid reference. The scanned component is treated as a fixed reference because it has already been manufactured and cannot be altered without significant cost. The remaining building model is treated as a malleable system, meaning components adjacent to the scanned component can be adjusted to maintain overall design integrity. The building model applies deformation algorithms to simulate how adjacent elements must shift to accommodate the fixed scanned component. A finite element analysis (FEA) approach calculates the optimal adaptation strategy by distributing dimensional changes across adjacent elements. If a scanned wall is tilted by 2%, the adjacent perpendicular wall is no longer flush. Instead of treating this as a rigid misalignment, the system models it as a surface deformation problem and increases the thickness of the adjacent wall. This ensures that joint integrity is preserved without introducing gaps. The soft-environment model updates iteratively, ensuring that cumulative errors do not propagate beyond local adjustments. The system determines whether each subsequent modification introduces further misalignments and automatically compensates for them.

In some embodiments, the system ensures geometric consistency when updating the digital model by integrating automated validation checks. If only parameters are updated instead of replacing the full model, the system uses constraint-based modeling to maintain alignment between adjacent components. Any modification is verified against predefined spatial constraints, preventing overlapping elements or unsupported structural changes.

In some embodiments, automated structural integrity checks assess load-bearing capacity, joint alignment, and material tolerances before recalculations are applied. The model runs collision detection algorithms to ensure newly adjusted components do not interfere with existing structures. Additionally, real-time finite element analysis (FEA) can be used to simulate stress distribution after adjustments, ensuring that recalculated components remain structurally sound.

In some embodiments, before finalizing updates, a stability verification process is conducted, where the system compares modified elements with regulatory compliance requirements and manufacturing feasibility constraints. If inconsistencies are detected, corrective measures—such as redistribution of tolerances across multiple components—are triggered automatically to preserve design intent while accommodating real-world deviations.

Step 4.1: Sequential Manufacturing and Assembly

In some embodiments, after updating the parameters of the remaining building components, the remaining building components are manufactured sequentially. Each manufactured building component is scanned, its data is updated in the digital information model of the building, and the data for the remaining unmanufactured building components is updated as described in Steps 3-5.

The sequence for manufacturing the remaining building components is selected such that interconnected elements are not simultaneously undergoing Steps 2-5.

In some embodiments, the remaining building components are manufactured sequentially, with each component undergoing the same process of scanning, updating the model, and recalculating parameters. Interconnected elements are not simultaneously in production to avoid errors in their connections.

In some embodiments, each component is manufactured, scanned, and updated in the model before proceeding to the next component. For example, in a prefabricated hospital, individual room modules may be produced one at a time to ensure tight dimensional control.

In some embodiments, the adjusted parameters are transmitted to a CNC machining system (Computer Numerical Control machining system) or robotic assembly system for dynamic compensation during manufacturing.

In some embodiments, robotic systems use the updated model to program precise assembly processes. For instance, a robotic arm may install precast facade panels based on real-time data from the digital model.

In some embodiments, non-interconnected components are produced in parallel, with their dimensions adjusted dynamically based on the updated model. For example, isolated truss sections for a stadium roof may be manufactured simultaneously while ensuring alignment during final assembly.

In some embodiments, in Step 1, when creating the digital information model of the building, each building component is assigned a unique identifier. This identifier, which may be numerical or take any other suitable form, remains unchanged throughout all subsequent steps of the method.

The assignment of a persistent identifier ensures that each building component can be uniquely tracked and referenced during the manufacturing and assembly process. This enables precise correlation between the digital model and the physical components, ensuring that each manufactured component is placed in its designated design position during the assembly of the building.

By maintaining the assigned identifier through all stages—scanning, digital model updates, recalculations, and final assembly—the system eliminates ambiguities in component placement and enhances the accuracy of the construction process. This approach ensures seamless integration of building components, reduces the risk of misalignment, and facilitates automated assembly by robotic systems.

The preferred realization of the described adaptive manufacturing method involves the construction of timber buildings, specifically those utilizing cross-laminated timber (CLT) and other engineered wood products.

Timber elements, particularly engineered wood products like CLT, are highly suited to modular and prefabricated construction methods. The adaptive manufacturing method described aligns with the modular nature of timber building components, where precise dimensional adjustments are essential for seamless assembly. By dynamically compensating for minor deviations in component dimensions, the method maximizes timber's inherent advantages in prefabrication, ensuring tight-fitting joints and structural accuracy.

Timber, while a robust construction material, can exhibit slight variations due to moisture content changes and curing processes. The scanning and recalibration steps in the adaptive manufacturing method address these potential variations by updating the digital information model to reflect the actual dimensions of each timber component. This ensures that any deviations are corrected before subsequent components are manufactured, enhancing dimensional stability and reducing the need for on-site adjustments.

The method is particularly effective for advanced timber construction techniques, such as hybrid timber structures and large-scale modular timber buildings. In these applications, maintaining precise connections between load-bearing elements, panels, and trusses is critical to ensuring structural integrity.

Moreover, timber buildings often incorporate customized designs and complex geometries, such as curved panels, vaulted ceilings, and intricate joint systems. The method's ability to adjust component parameters based on real-time scanning data enables the accurate production of these non-standard elements while maintaining overall geometric consistency within the building model.

The terms and definitions used in this application are provided solely for the purpose of describing the invention and facilitating its understanding. They should not be interpreted in a manner that limits the scope of the claims or restricts the applicant's rights.

The embodiments and examples disclosed in this application are illustrative and non-limiting. Variations, modifications, and equivalents that fall within the spirit and scope of the invention, as defined by the appended claims, are intended to be encompassed therein.

The use of singular terms, such as "a," "an," and "the," should also be interpreted to include plural forms unless explicitly stated otherwise. Similarly, the use of specific terms should not be construed as excluding equivalents that serve the same function or achieve the same result.

The scope of the invention is defined by the claims, and the description should not be used to limit the interpretation of these claims.

The invention claimed is:

1. A method for adaptive manufacturing of building components performed by a processor comprising the following steps:
    creating a digital information model of a building containing at least building components' dimensions and positions, wherein the digital information model associates each building component with its persistent unique identifier;
    manufacturing the at least one building component identified by its persistent unique identifier;
    scanning the at least one manufactured building component identified by its persistent unique identifier using at least one of laser scanning, or structured light scanning, or ultrasound-based scanning to generate a digital representation of the scanned manufactured building component's actual dimensions and shape;
    updating the digital information model based on at least the scanned manufactured building component's actual dimensions and shape to dynamically adjust manufacturing parameters for subsequent building components;
    recalculating and adjusting the dimensions and/or shape of those unmanufactured building components that have at least one surface adjacent to at least one surface of the scanned manufactured building component based on deviations detected in the scanned manufactured building component,
    wherein the adjustments are transmitted to an automated manufacturing system for real-time modifications to production equipment,
    wherein during manufacturing of each subsequent building component, the said adjusted dimensions and/or shape obtained from the most recently updated digital information model are used.

2. The method of claim 1, wherein the method is preformed for construction of timber buildings.

3. The method of claim 1, wherein multiple building components are manufactured simultaneously, provided that the manufactured building components are not interconnected elements, such that they do not form mating or adjacent connections during assembly.

4. The method of claim 1, wherein the recalculation and adjustment of remaining components involve a constraint-based modeling approach.

5. The method of claim 1, wherein adjustments to remaining components are constrained by predefined tolerance limits to prevent excessive deformation or overcorrection.

6. The method of claim 1, wherein modifications to the digital information model are synchronized across multiple manufacturing sites using a cloud-based collaboration platform.

7. The method of claim 1, wherein deviation compensation strategies prioritize either adjusting adjacent components or, if said deviations exceed a predetermined threshold, remanufacturing the scanned manufactured building component.

8. A system for adaptive manufacturing of building components, comprising:
    at least one processor configured to execute adaptive manufacturing instructions and control at least one automated manufacturing device;
    a digital information model storing at least building components' dimensions, positions, with a persistent unique identifier assigned to each said building component;
    a building component identification module configured to assign the persistent unique identifier to each building component in the digital information model;
    a scanning module comprising at least one of a structured light scanner, a laser scanner, or an ultrasound-based metrology system, wherein the scanning module is configured to capture actual dimensions of manufactured components identified by their persistent unique identifiers using structured light, or laser scanning, or ultrasound-based metrology techniques;
    at least one computer processor having memory and programmed logic, wherein the processor is configured to compare scanned model and detect deviations;
    a software module executing on the processor, wherein the software module is programmed to adjust the dimensions and/or shape of those unmanufactured building components that have at least one surface adjacent to at least one surface of a scanned manufactured building component based on detected deviations, wherein the adjusted dimensions and/or shape, obtained from the most recently updated digital information model, are transmitted to at least one manufacturing device configured to manufacture at least one building component identified by the persistent unique identifier.

9. The system of claim 8, wherein the processing unit employs artificial intelligence (AI)-based algorithms to optimize recalculations and predict potential deviations before manufacturing.

10. The system of claim 8, wherein the scanning module selects scanning technology dynamically based on material reflectivity, density, and surface properties.

11. The system of claim 8, further comprising an automated validation module that performs real-time compliance checks against structural regulations before finalizing component modifications.

12. The system of claim 8, wherein modifications to component parameters account for material behaviors.

13. The system of claim 8, wherein deviation adjustments incorporate a soft-environment modeling approach to balance modifications across multiple components and avoid excessive stress concentrations.

* * * * *